March 3, 1959 — W. E. KNAPP ET AL — 2,876,017
TRANSPORT AXLE LIFTING LINKAGE
Filed Dec. 14, 1953 — 2 Sheets-Sheet 1
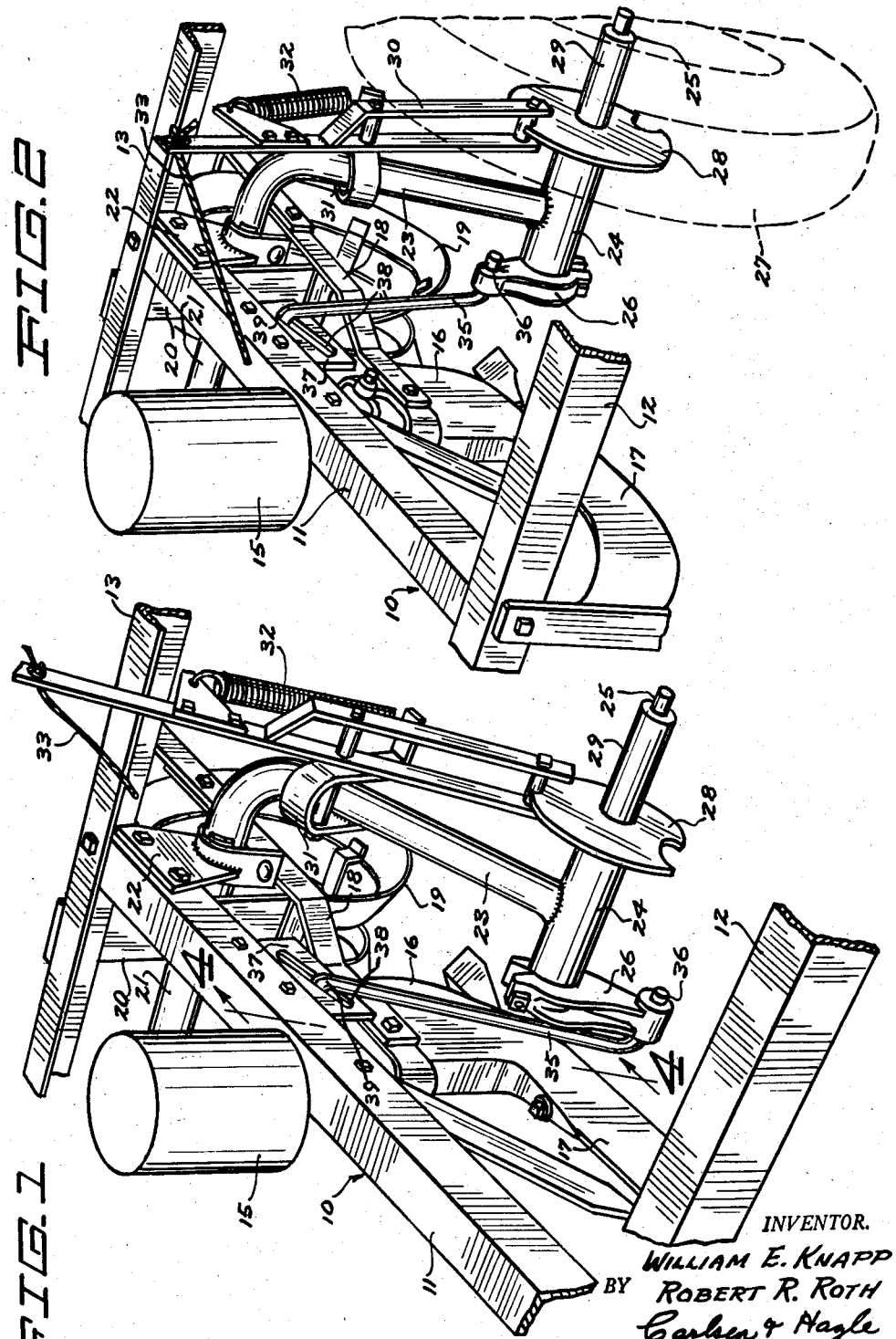
INVENTOR.
WILLIAM E. KNAPP
ROBERT R. ROTH
BY Carlsen & Hagle
ATTORNEYS

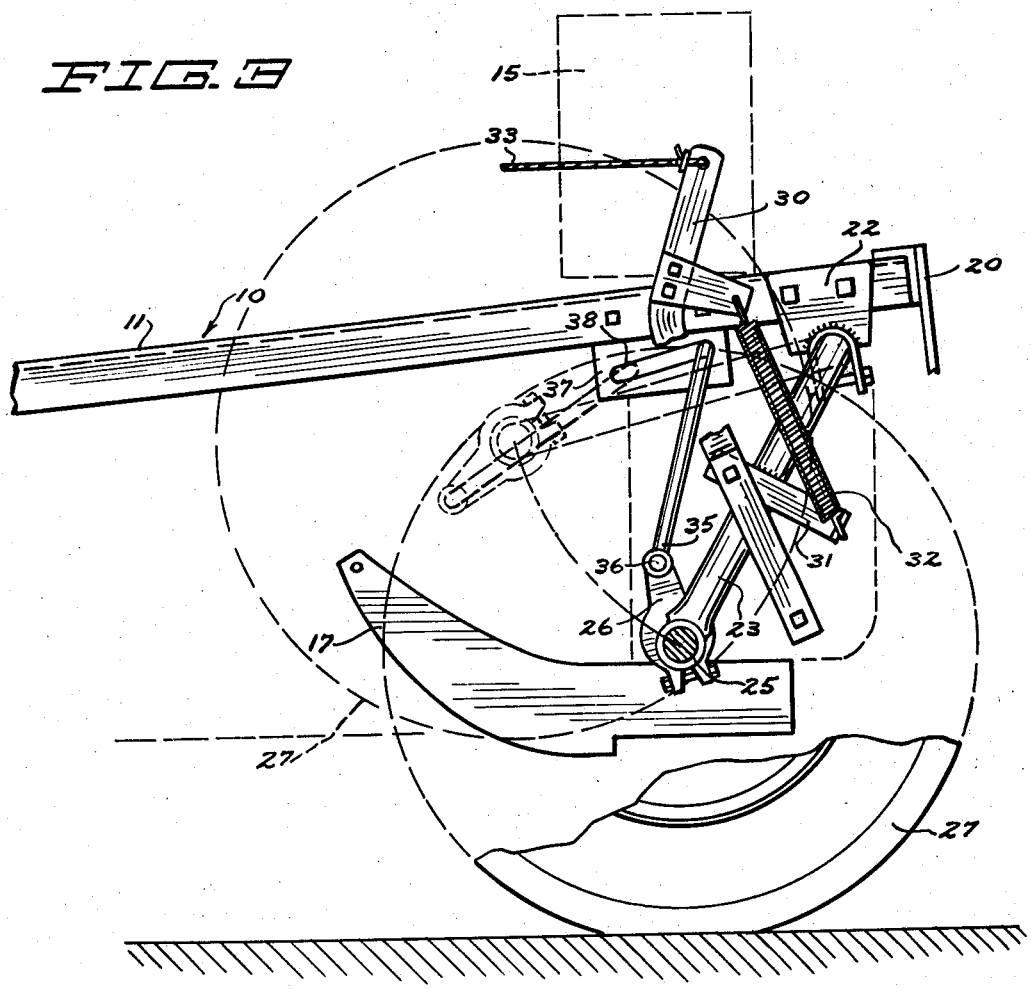
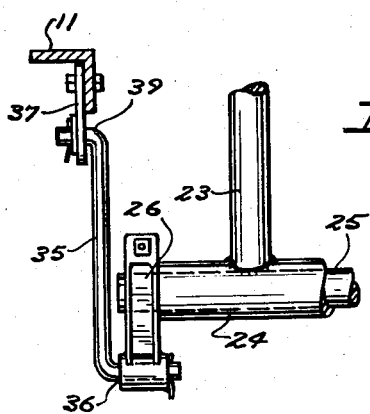

United States Patent Office 2,876,017
Patented Mar. 3, 1959

2,876,017

TRANSPORT AXLE LIFTING LINKAGE

William E. Knapp, Moline, and Robert R. Roth, Rock Island, Ill., assignors to Minneapolis-Moline Company, Hopkins, Minn., a corporation of Minnesota Application December 14, 1953, Serial No. 398,026

6 Claims. (Cl. 280—47)

This invention relates generally to agricultural implements and more particularly to the transport mechanism used therein.

The principal object of the invention is to provide an improved power lift linkage mechanism for implements adapted to raise the implement frame relative to the wheels to a transport position and to relatively lock the frame and wheels in such position.

Another object of the invention is to provide an improved transport crank axle construction for implements wherein the implement frame will be locked to the axle when in transport position but which allows relative movement between the two when the implement is in operating position.

Still another object of the invention is to provide an improved lifting link construction for raising and lowering an implement frame relative to its transport crank axle wherein the link is slidably associated with the frame but functions in the same manner as though it were on a fixed pivot during the frame raising operation.

With these and other objects in mind the invention broadly comprises an agricultural implement having a frame, said frame carrying a longitudinal slide means, a crank axle swingably connected with the frame and carrying a ground wheel swingable relative to the frame with the crank axle between raised and lowered positions, a clutch on the crank axle driven from the ground wheel and including a clutch operated crank arm, control means for activating the clutch, a lift link having its lower end pivoted to the crank arm and its upper end having engagement with said slide means for sliding movement therealong to swing the axle and the wheel carried thereby between their raised and lowered positions when the clutch is operated, said slide means extending primarily in a fore and aft direction on the frame, and said link so connected as to assume a generally upright position when the wheels are lowered.

The above mentioned and still additional objectives will be brought to light during the course of the following specification, reference being made to the accompanying drawings, in which Fig. 1 is a front left side perspective view of one end of the crank axle and the rear portion of the implement frame carried thereby with our improved lifting link construction incorporated therein. The implement is here shown in lowered or operating position on level ground.

Fig. 2 is similar to Fig. 1 with the implement in raised or transport position.

Fig. 3 is a diagrammatic left side elevation of the implement frame, axle and lifting mechanism in transport position as in Fig. 2 with a ground working position of the axle, wheel, and linkage shown in broken lines.

Fig. 4 is a front elevation of the lifting link and its end conections with the wheel axle in a raised position relative to the implement frame.

Referring now more particularly to the drawings, reference numerals will be used to denote like structural elements and features in the different views. Our improved lost motion linkage can be used on any implement having a wheel driven clutch on the crank axle but as illustrative of its application we have shown it in a planting implement. The implement is of conventional design and we have shown only the portion thereof which is important for complete understanding of the invention, that being the left end of the crank axle, the clutch and the linkage between the clutch and implement frame which assures ground wheel traction at all times. The implement, of course, has suitable complementary frame structure at its right side with a ground wheel at the right end of the crank axle.

The planter frame is indicated generally by the numeral 10 and includes a longitudinally extending beam 11 rigidly connecting front and rear cross beams, denoted at 12 and 13 respectively. Frame 10 carries one or more transversely spaced planting units each of which includes a seed hopper 15 mounted to dispense seed through the valve housing 16 to the runner 17. A pair of fork arms 18 extend rearwardly from the housing 16 and carry at their rear ends suitable bearing brackets for journaling the axle of a press wheel 19 for travel of the press wheel in the path of the runner 17. A bracing member 20 extends from the rear bar 13 to the arms 18 to rigidify the arms with the frame 10 and insure a fixed turning axis of the press wheel relative to the frame. Of course, there is such a press wheel mounted to travel behind each planter unit carried by the frame.

A one-piece crank axle 21, formed preferably of round stock bent to the desired shape, is swingably mounted on the frame by being journaled in bracket 22 which is secured to beam 11. The axle mounting allows its movement about a transverse axis and the axle section 23 extends downwardly and forwardly for swinging in a longitudinal vertical plane. Axle section 23 rigidly carries a transverse tubular sleeve 24 at its lower end.

A clutch shaft 25 is journaled for rotation in the sleeve 24 and has a lifting arm or crank 26 fixed to its inner end. At its outer end the shaft 25 rotatably carries a ground wheel 27 as shown in broken lines in Figs. 2 and 3. The wheel is adapted to actuate a traction driven half-revolution clutch 28 of conventional construction. The clutch has a part 29 driven by the wheel 27 and mechanism controlled by lever 30 for throwing part 29 into connection with shaft 25 to rotate the shaft and arm 26 one-half revolution with the wheel in a counter-clockwise direction as viewing the machine from the left. The control lever engages in two notches in clutch 28 to lock arm 26 with respect to crank axle 21 in either the position of Fig. 1 or the position of Fig. 2. Inasmuch as the clutch is of conventional construction and forms no part of this invention it is not shown in detail. It may well be constructed for the purposes of this disclosure in accordance with patent No. 2,031,650 to Hendricks et al.

Control lever 30 is mounted as by bracket 31 on the axle section 23, as shown, for operation on a transverse pivot, spring 37 holding the lever in engagement with the clutch plate with a pull rope 33 extending from the lever to the operator's station for trip operation of the lever as desired.

The two different positions of the clutch shaft 25 and the arm 26 carried thereby are shown in Figs. 1 and 2. It will be noted that when the arm 26 extends forwardly and downwardly, as in Fig. 1, the crank axle section 23 and the parts carried thereby, including the ground wheel 27, are in a raised position relative to the frame 10. On the other hand, when the shaft 25 has been rotated one-half revolution so that crank arm 26 projects upwardly the axle section and wheel 27 are in a lowered position relative to the frame 10.

The wheel is lowered relative to the frame or, conversely, the frame raised relative to the wheel by means of a lifting link 35 which connects the crank arm to the frame. This link has its lower end journaled in, or otherwise pivotally connected to, the extended end of the crank arm as at 36 (Fig. 4). A plate 37 is mounted to depend from the beam 11 and has an elongated slot 38 therein for slidably carrying the upper inwardly angled end 39 of link 35. Slot 38 extends longitudinally with respect to the direction of travel, opening sidewardly, with plate 37 longitudinally posititoned to lie vertically above the extended end of the crank arm when the wheel is lowered as in Fig. 2.

While the slot 38 extends primarily in a fore and aft direction on the near horizontal and may in fact be horizontal it is found preferable to have it incline slightly forward in the manner clearly shown in Fig. 3. This is to prevent any forward slippage of link portion 39 when the implement is in transport position.

The operation of my improved linkage will now be described. It will be understood that when the implement is in ground working position the wheel 27 is raised with the crank axle 23 in the forwardly swung position, as shown in Fig. 1. When in this position the weight of the implement is disposed mainly upon the press wheels 19 and the depth of the implement is controlled thereby. The ground wheel 27 is in floating traction with the ground, the crank axle being allowed freedom for rocking movement in the brackets 22. Accordingly, wheel 27 is in constant ground contact even though it does not carry the weight of the implement as it may freely lower and rise as ground depressions or bumps are met. It will be noted (Fig. 1) that when the implement is in working position in level ground, the link portion 39 is spaced from both ends of slot 38 and is freely slidable forwardly and rearwardly so as not to interfere with the floating action of the wheel and axle. The view in broken lines in Fig. 3 shows the link in a forward position in the slot 38 such as occurs prior to the entrance of runners 17 into the ground or where the wheel 27 engages a ground depression during operation.

To lower the wheel 27 relative to the frame 10 so as to bring the implement to a transport position trip lever 30 is pulled by means of rope 33 to release the clutch plate 28. As heretofore described this causes the clutch member 29, driven by wheel 27, to rotate the shaft 25 one-half revolution swinging crank arm 26 to an upright position. With the rearward and upward swinging of the arm, from the position shown in broken lines to the position shown in full lines in Fig. 3, the portion 39 of link 35 is moved rearwardly in the slot 38 until it engages the rear end thereof. With continued upward swinging of crank arm 26, the lifting link 35 and arm coming into alignment between the shaft 25 and slot 38 will cause a relative spreading between the frame 10 and ground wheel axis causing the crank axle section 23 to swing downwardly to the transport position shown in Fig. 2.

When it is desired to then bring the implement again to a ground working position tthe trip lever 33 is again actuated operating clutch 28 to swing the clutch arm 26 forwardly and downwardly to the position of Fig. 1. This allows the wheel to raise relative to the frame with axle section 23 moving to its forward position.

As heretofore mentioned, it will be noted that when the wheel is raisesd as in Fig. 1, and traveling on level ground, the link upper end 39 lies intermediate the ends of the slot 38 with the link at a very acute angle to the slot. This allows the link to slide forwardly and rearwardly in the slot a limited distance and a floating action of wheel 27 for ground contact at all times as the crank axle freely raises and lowers about its transverse axis so as not to interrupt operation of mechanism driven from the ground wheel when humps or depressions in the ground are encountered by the wheel.

However, when the wheel is lowered to a transport position, as in Fig. 2, it becomes locked to the frame. This is due to the fact that the slot extends longitudinally of the direction of travel on the near horizontal while the lifting link has been moved to an upright position with the upper end portion 39 thereof seated firmly against the rear edge of the slot. It will accordingly be seen (Fig. 3) that the link 35 is at only a slightly acute angle to the slot in this position or at an acute angle which is nearer to a right angle than it is to alignment with the slot. In Fig. 3 we have shown this angle to be about sixty degrees. However, the invention will also operate where the angle is a few degrees lower or as high as ninety degrees. When the link is at such an angle to the slot the link being restrained by the side edges of the slot will lock the wheels 27 and its carrying crank axle against rocking movement about the transverse axis of the axle.

Were the slot vertical or deeply angular while the construction might allow the desired floating action in operating position, the frame could bounce upwardly in transport without carrying the wheel with it. This could cause the axle to "walk" under the frame should the wheels be caught in a ditch or the like. Accordingly, our construction locks the axle and wheels to the frame in transport position while yet allowing the wheels to float while the implement is in ground working position with the weight of the implement resting on the press wheels.

We have accordingly provided a transport axle lifting and lowering linkage which effectively and economically carries out the aforementioned objectives. It is understood that suitable modifications may be made in the structure as disclosed, provided such modifications come within the spirit and scope of the appended claims.

Having now therefore fully illustrated and described our invention, what we claim to be new and desire to protect by Letters Patent is:

1. In an agricultural implement, a frame, a crank axle swingably connected with the frame and carrying a ground wheel swingable relative to the frame with the crank axle between raised and lowered positions, a clutch on the crank axle driven from the ground wheel and including a clutch operated crank, control means for activating the clutch, a lift rod having its lower end pivoted to the crank and its upper end connected on a sliding pivot to the frame, and the path of said sliding pivot extending primarily fore and aft with respect to the direction of ground wheel travel.

2. In an agricultural implement adapted for trailing draft connection to a draft vehicle, a frame, a crank axle swingably connected with the frame and carrying a ground wheel swingable relative to the frame with the crank axle between raised and lowered positions, a clutch on the axle and driven from the ground wheel and including a clutch operated crank, control means for activating the clutch to move the crank between radially opposite positions with respect to the wheel axis, a bracket mounted on the frame and having an elongated slot opening laterally and extending longitudinally of the direction of travel of the wheel, a lifting link having its lower end pivoted to the crank and its upper end bent at an angle and extending through said slot to ride therein between a forward position when the wheel is raised and a rearmost position when the wheel is lowered, said bracket disposed with the rearmost end of said slot spaced above and rearward of the crank link pivot when the axle is lowered for upward inclined extension of the link with its lower end forward of its upper end, and the rearmost end of said slot being higher than the forwardmost end of the same for inclination of the slot in a forward and downward direction.

3. In an agricultural implement, a wheeled frame in which the wheels are attached to the frame by means of a crank axle for movement of the wheels between raised and lowered positions with respect to the frame, a swingable crank arm on the crank axle, clutch means on the crank axle for effecting a drive connection between a ground wheel and the crank arm to swing the latter between different positions, means for selectively operating the clutch means, a lifting link having its lower end pivoted to the crank arm to swing therewith and its upper end pivoted to the frame, said upper end pivot including a slot in the frame for slidably holding the link end and allowing movement of the link along a fore and aft directed straight path, the rear end of the slot being higher than the forward end thereof.

4. In an agricultural implement, a frame, a crank axle carrying a transport assembly and journaled on the frame for movement between a raised idle position and a lowered transport position relative to the frame, said assembly including a clutch operated swingable lifting link having its upper end slidably pivoted to the frame for vertical floating movement of the assembly in idle position, clutch control means for swinging the link to an upright position to move the assembly to its lowered transport position, and the path of said sildable pivot being on the near horizontal to prohibit sliding movement of the link therealong when in its upright position.

5. In an agricultural implement, an implement frame, a crank axle journaled on the frame and carrying a ground wheel assembly for movement between raised and lowered positions relative to the frame, said assembly including a ground wheel, a crank arm mounted coaxial with the wheel, and a clutch means for placing the ground wheel in driving connection with the crank arm to move the arm between raised and lowered positions, said frame having a straight elongated slot therein, a rigid lifting link having one end pivoted to the crank arm and the other end disposed for sliding pivotal movement in said slot for swinging movement to an upright position to lower the wheel assembly when the crank arm is moved to its raised position, and the slot extending primarily in a fore and aft direction so as to be nearer to perpendicular than parallel to the upright link.

6. In an agricultural implement, a frame having a ground wheel for travel of the frame over the ground, said wheel being mounted on the frame by means of a crank axle journaled on the frame for raising and lowering of the frame relative to the wheel, a crank arm mounted on the axle coaxial with the wheel, clutch means on the axle for operatively connecting the crank arm to the ground wheel for rotating the arm between upwardly and downwardly extending positions, and a lifting link having one end pivoted to the frame and the other end pivoted to the crank arm to raise the frame as the arm is moved to its upwardly extending position, said connection of the link to the frame being slidable along a fore and aft path, said other end pivot of the link being so located as to be spaced vertically below said path when the crank arm is in upwardly extending position with the link lying at only a slightly acute angle to the path.

References Cited in the file of this patent

UNITED STATES PATENTS

| | | |
|---|---|---|
| 1,149,995 | Dodson | Aug. 10, 1915 |
| 2,031,650 | Hendricks et al. | Feb. 25, 1936 |